(12) United States Patent
Wray

(10) Patent No.: US 12,433,435 B2
(45) Date of Patent: Oct. 7, 2025

(54) EATING UTENSIL

(71) Applicant: Morris Wray, Goodlettsville, TN (US)

(72) Inventor: Morris Wray, Goodlettsville, TN (US)

( * ) Notice: Subject to any disclaimer, the term of this patent is extended or adjusted under 35 U.S.C. 154(b) by 783 days.

(21) Appl. No.: 17/835,156

(22) Filed: Jun. 8, 2022

(65) Prior Publication Data

US 2022/0400883 A1 Dec. 22, 2022

Related U.S. Application Data

(60) Provisional application No. 63/212,258, filed on Jun. 18, 2021.

(51) Int. Cl.
A47G 21/00 (2006.01)
A47G 21/06 (2006.01)

(52) U.S. Cl.
CPC .................... A47G 21/103 (2013.01)

(58) Field of Classification Search
CPC ........ A47G 21/02; A47G 21/10; A47G 21/04; A47G 21/023; A47G 21/06; A47G 2021/002; A47G 21/08; A47G 21/001; A47G 21/103; A47G 19/02; A47G 19/065; A47J 43/283; A47J 47/16; A47J 43/0738
USPC ......... 294/99.2, 16, 3, 218, 106, 25; 30/324, 30/147, 150, 322, 326
See application file for complete search history.

(56) References Cited

U.S. PATENT DOCUMENTS

| | | | | |
|---|---|---|---|---|
| 2,647,006 | A * | 7/1953 | Coyle | D06F 5/06 294/8.5 |
| 5,199,756 | A | 4/1993 | Bartlett et al. | |
| 7,234,745 | B1* | 6/2007 | Tsai | A47G 21/103 294/99.2 |
| 7,316,434 | B1 | 1/2008 | Kerr | |
| 7,628,432 | B2* | 12/2009 | Flather | A47G 21/02 294/99.2 |
| D1,038,716 | S * | 8/2024 | Wray | D7/686 |
| 2007/0130034 | A1 | 6/2007 | Yamanaka et al. | |
| 2014/0332439 | A1 | 11/2014 | Glassman | |
| 2019/0099023 | A1 | 4/2019 | Kwan-Gett | |
| 2020/0069093 | A1* | 3/2020 | Knight | A47G 21/103 |

FOREIGN PATENT DOCUMENTS

DE  3733937 A1  4/1989

OTHER PUBLICATIONS

PCT Written Opinion of the International Searching Authority, in International Application No., PCT/US22/32644, mailed Sep. 9, 2022, 12 pp.

* cited by examiner

Primary Examiner — Jacob A Smith
(74) Attorney, Agent, or Firm — Shane Cortesi

(57) ABSTRACT

The present disclosure provides an eating utensil. The eating utensil may include a top arm pivotally attached to the bottom arm, and the interior surfaces of the arms may include rows of ridges and grooves that mate when the eating utensil is in the closed position. The eating utensil may further include a lock to hold the arms in a particular position.

29 Claims, 9 Drawing Sheets

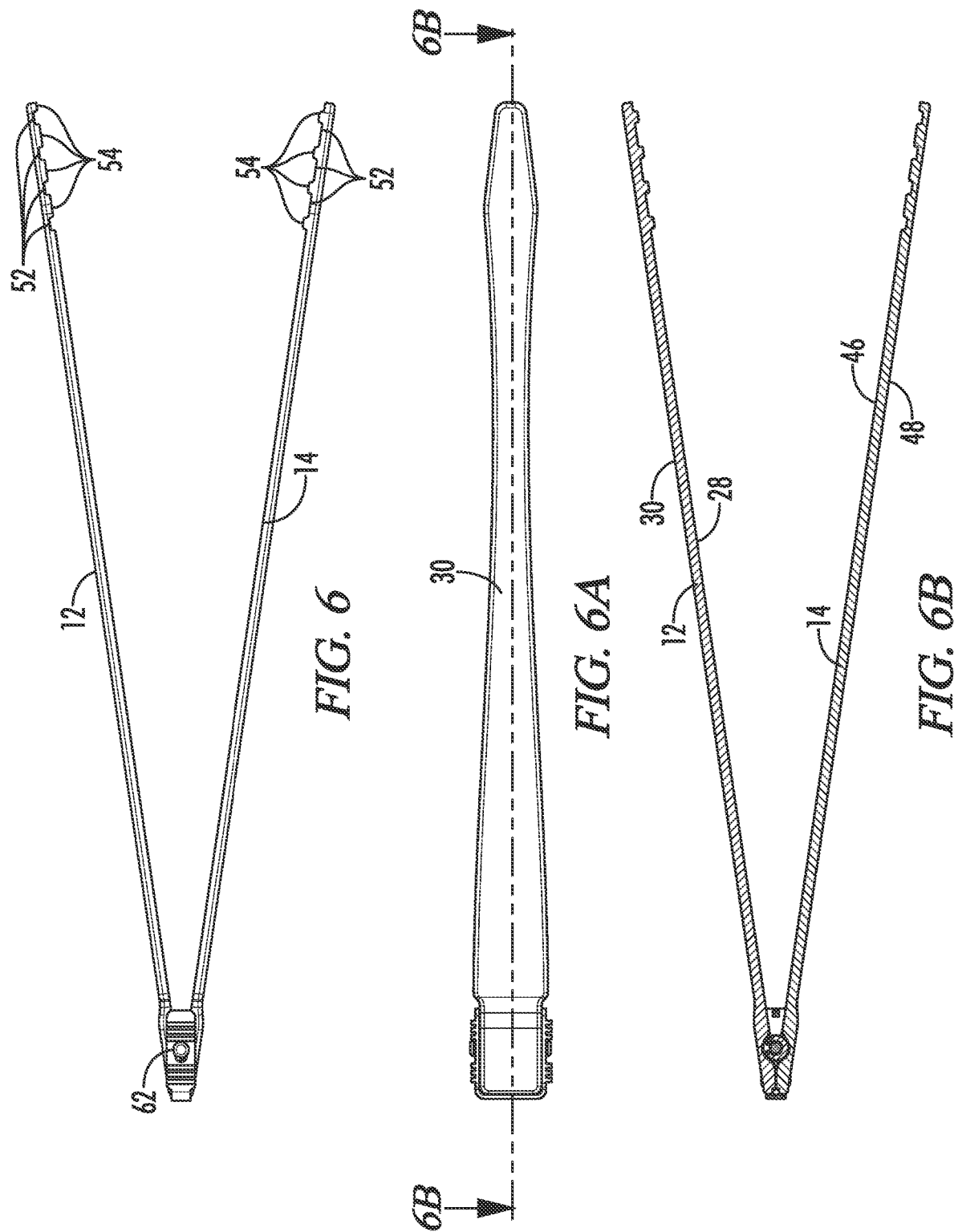

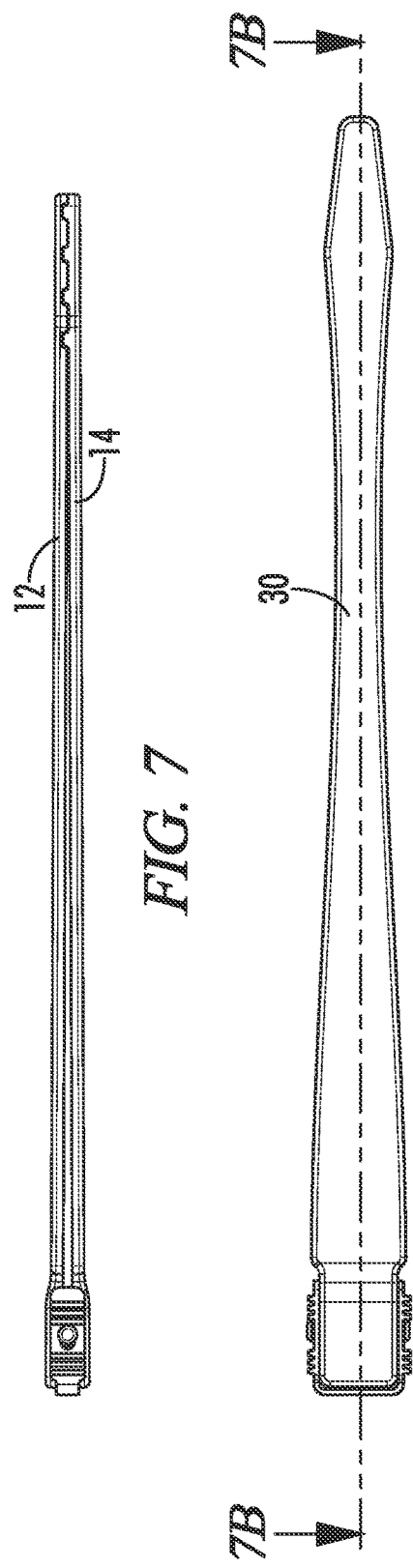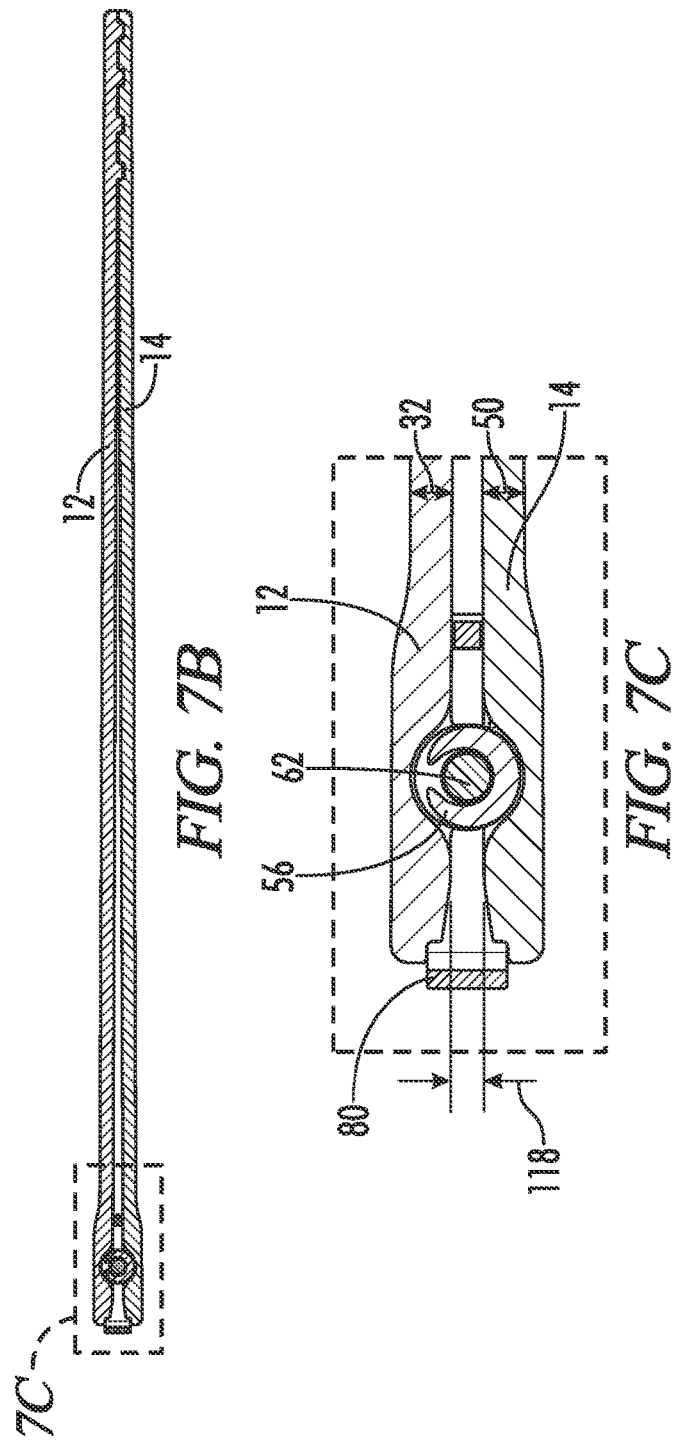

EATING UTENSIL

BACKGROUND

Technical Field

The present invention relates to eating utensils.

Background of the Invention

Traditional eating utensils include for example spoons, forks, and chopsticks.

While tongs with pivoting arms are known for serving food, tongs are not typically used as utensils for eating food. Tongs are also typically wide and typically do not include teeth that extend across the width of the arms.

SUMMARY OF THE INVENTION

The present disclosure provides an eating utensil as described herein.

In some embodiments, the present disclosure is directed to an eating utensil. The eating utensil may include a top arm and a bottom arm. Optionally, each of the top arm and the bottom arm may comprise a front end, a rear end, a length extending from the front end to the rear end, a left side, a right side, a width extending from the left side to the right side perpendicular to the length, an interior surface, an exterior surface opposite the interior surface, and a thickness perpendicular to the width and length. Optionally, the interior surface of the top arm faces the interior surface of the bottom arm. Optionally, the top arm is pivotally attached to the bottom arm adjacent to the rear ends of the top arm and bottom arm. Optionally, the top arm and the bottom arm each have a length of from about 5 inches to about 8 inches. Optionally, the top arm and the bottom arm each have a maximum width of from about 0.25 inches to about 0.75 inches. Optionally, the interior surface each of the top arm and bottom arm comprise a plurality of grooves and ridges, which may extend across the interior surface of the respective arm and parallel to the widths of the respective arm. Optionally, the plurality of grooves and ridges are located adjacent the front ends of the respective arm. Optionally, the eating utensil is configured to pivot between a closed position in which the plurality of grooves and ridges of the top arm mate with the plurality of grooves and ridges of the bottom arm and an open position in which the plurality of grooves and ridges of the top arm are apart from the plurality of grooves and ridges of the bottom arm. Optionally, the eating utensil further comprises a spring having a first end confronting the interior surface of the top arm and a second end confronting the interior surface of the bottom arm. Optionally, the spring is configured to bias the eating utensil in the open position.

Optionally, the eating utensil further comprises a pivot pin connecting the top arm to the bottom arm, the pivot pin located adjacent the rear ends of the top arm and bottom arm and extending parallel to the widths of the bottom arm and the top arm, wherein the spring extends around the pivot pin, wherein the pivot pin forms a pivot axis extending parallel to the widths of the bottom arm and the top arm and further wherein the top arm and the bottom arm are configured to rotate about the pivot axis when the eating utensil pivots between the open position and the closed position.

Optionally, adjacent to the rear ends of the respective arms, the interior surfaces of each of the top arm and bottom arm each comprise at least one protrusion extending toward the interior surface of the other arm, the at least one protrusion comprising a hole capturing the spring. Optionally, the eating utensil further comprises a lock, the lock, when engaged, preventing the eating utensil from pivoting between the open position and the closed position. Optionally, the lock is in the form of a U-shaped slide comprising a left side comprising a hole receiving the pivot pin and configured to slide along the left sides of the top arm and the bottom arm, a right side comprising a hole receiving the pivot pin and configured to slide along the right sides of the top arm and the bottom arm, and a rear end facing the rear ends of the top arm and the bottom arm. Optionally, moving the U-shaped slide forwardly is configured to engage the lock and moving the U-shaped slide rearwardly is configured to disengage the lock and allow the eating utensil to pivot between the open position and the closed position. Optionally, each of the left side and right side of the U-shaped slide comprise at least one ridge extending parallel to the thicknesses of the respective arm to allow a user to grip the U-shaped slide. Optionally, the top arm is a solid piece of metal and the bottom arm is a solid piece of metal. Optionally, the exterior surfaces of each of the top arm and the bottom arm are flat. Optionally, the top arm and bottom arm each comprise a front section in the shape of a truncated diamond, and further wherein the front sections of the top arm and the bottom arm comprise at least some of the plurality of ridges and grooves. Optionally, wherein the front sections of the top arm and the bottom arm comprise all the plurality of ridges and grooves. Optionally, the top arm and the bottom arm each comprise an intermediate section located immediately rearwardly relative to the front section, and the intermediate sections comprise a maximum width of between about 0.2 inches to about 0.3 inches. Optionally, the top arm and the bottom arm each comprise a rear section located immediately rearwardly relative to the intermediate section of the respective arm, and further wherein the rear sections comprise a maximum width of from about 0.4 inches to about 0.6 inches, and further wherein the rear sections taper in decreasing width as the rear sections approach the intermediate sections. Optionally, the width of the front end of the top arm is less than the minimum width of the intermediate section of the top arm and further wherein the width of the front end of the bottom arm is less than the minimum width of the intermediate section of the bottom arm. Optionally, the eating utensil further includes a cover in the shape of a truncated diamond and further wherein the front sections of the top and bottom arm are located in the cover. Optionally, the cover further comprises a lid configured to open and close along a lid axis parallel to the widths of the top arm and bottom arm, the further comprising an open rear and a front side opposite the open rear, the front side facing the front ends of the top arm and bottom arm. Optionally, the top arm and bottom arm are mirror images of each other. Optionally, the widths of each of the top arm and the bottom arm vary along the lengths of the respective arm. Optionally, the top arm and the bottom arm each have a length of from about 6.5 inches to about 7 inches. Optionally, the plurality of ridges of each arm have a height that is parallel to the thickness of the respective arm is between about 0.02 inches and about 0.04 inches and further wherein the plurality of grooves of each arm have a depth that is parallel to the thickness of the respective arm that is between about 0.02 inches and about 0.04 inches. Optionally, the plurality of ridges of each arm have a length that is parallel to the length of the respective arm that is between about 0.05 inches and about 0.15 inches and the plurality of grooves of each arm have a length that is parallel to the length of the respective arm that is between about 0.1 inches and about 0.25 inches. Optionally, the top arm and the bottom arm each comprise at least three rows of ridges and three rows of grooves and further wherein adjacent ridges on the top arm are spaced equally apart by a groove and each row of adjacent ridges on the bottom arm are spaced equally apart by a groove. Optionally, the distance between the interior surface of the top surface and the interior surface of the bottom arm in the closed position at the pivot pin is between about 0.025 inches and about 0.075 inches. Optionally, one arm has longer grooves but shorter ridges than the other arm. Optionally, each arm has a thickness of from about 0.05 inches to about 0.1 inches.

In still further embodiments, the present disclosure provides a method of using an eating utensil comprising the steps of: a) providing the eating utensil; b) placing an item of food between the top arm and the bottom arm; and c) moving the item of food into a human user's mouth.

In still further embodiments, the present disclosure provides a method of using an eating utensil comprising the steps of: a) providing the eating utensil wherein the eating utensil is in the open position; b) placing at least one finger of a human user on the top arm of the eating utensil; c) placing at least one other finger of the human user on the bottom arm, wherein the at least one other finger is on the same hand of the human user as the least one finger; d) placing an item of food between the top arm and the bottom arm; and e) pivoting the eating utensil toward the closed position to secure the item of food between the top arm and the bottom arm. Optionally, the method further includes: f) eating the item of food.

BRIEF DESCRIPTION OF THE DRAWINGS

in FIG. 1, the eating utensil is in the open position.

FIG. 6 illustrates a side elevation view of the eating utensil of FIG. 1 with the eating utensil in the open position.

FIG. 6A illustrates a top plan view of the eating utensil of FIG. 1 with the eating utensil in the open position.

FIG. 6B illustrates a side cross-sectional view of the eating utensil of FIG. 1 taken along line 6B-6B of FIG. 6A.

FIG. 7 illustrates a side elevation view of the eating utensil of FIG. 1 with the eating utensil in the closed position.

FIG. 7A illustrates a top plan view of the eating utensil of FIG. 1 with the eating utensil in the closed position.

FIG. 7B illustrates a side cross-sectional view of the eating utensil of FIG. 1 taken along line 7B-7B of FIG. 7A.

FIG. 7C illustrates a closeup view of the boxed area labelled 7C in FIG. 7B.

in FIG. 13, the eating utensil is in the closed position and a band is encircling the top and bottom arms to hold the eating utensil in a closed position.

in FIG. 16, the cover is in an open position.

DETAILED DESCRIPTION

Figure 1:
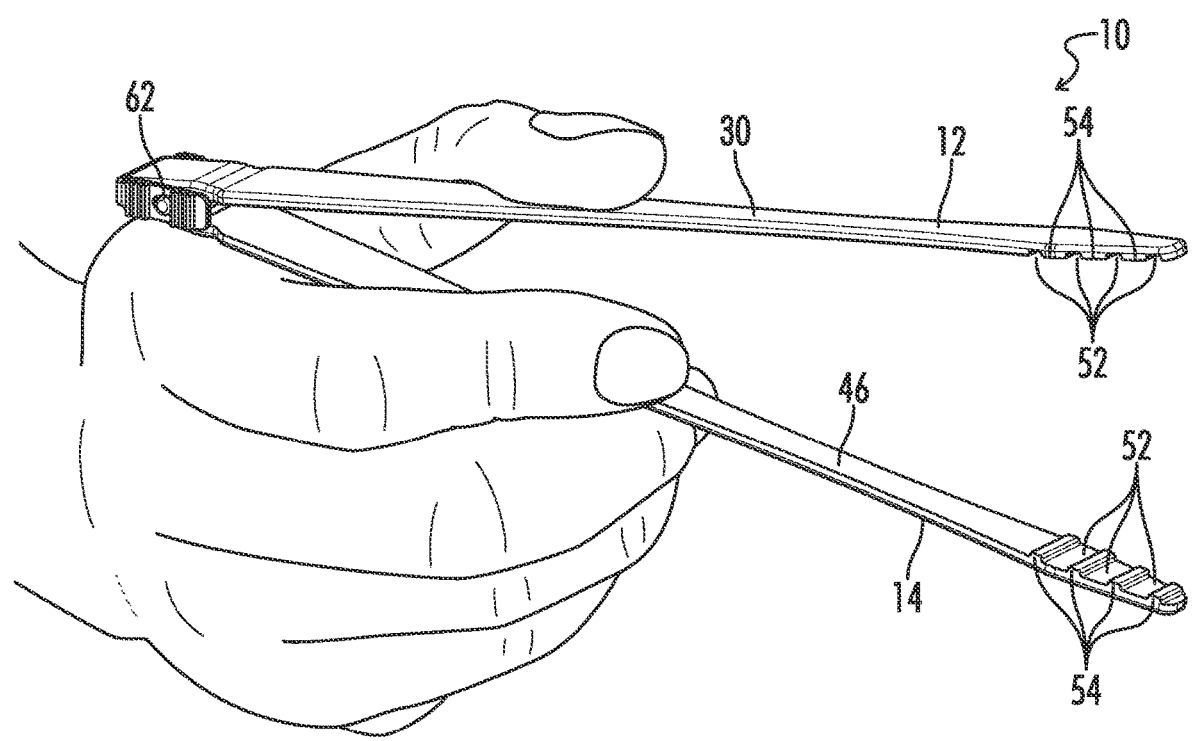
FIG. 1 illustrates a side perspective view of a user holding an eating utensil of one embodiment of the present invention.
Figure 2:
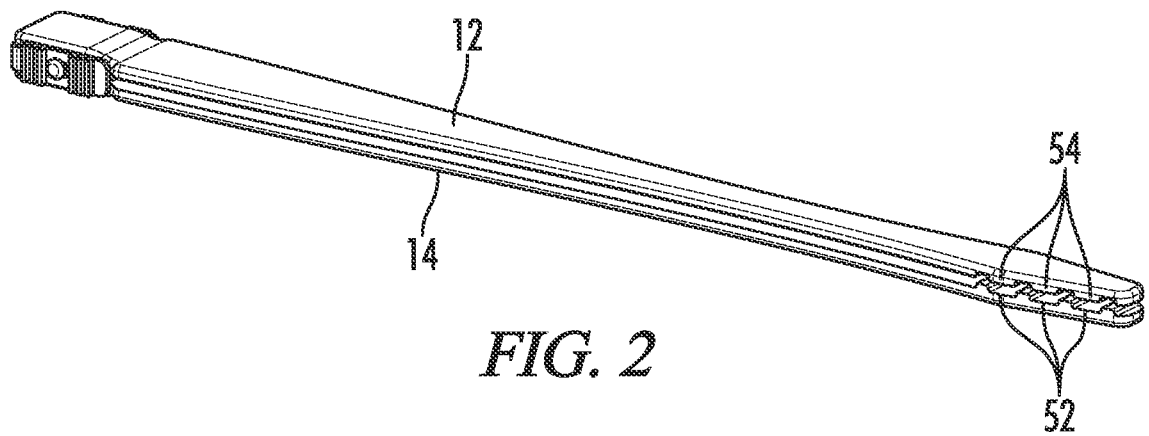
FIG. 2 illustrates a side perspective view of the eating utensil of FIG. 1 with the eating utensil in the partially closed position.
Figure 3:
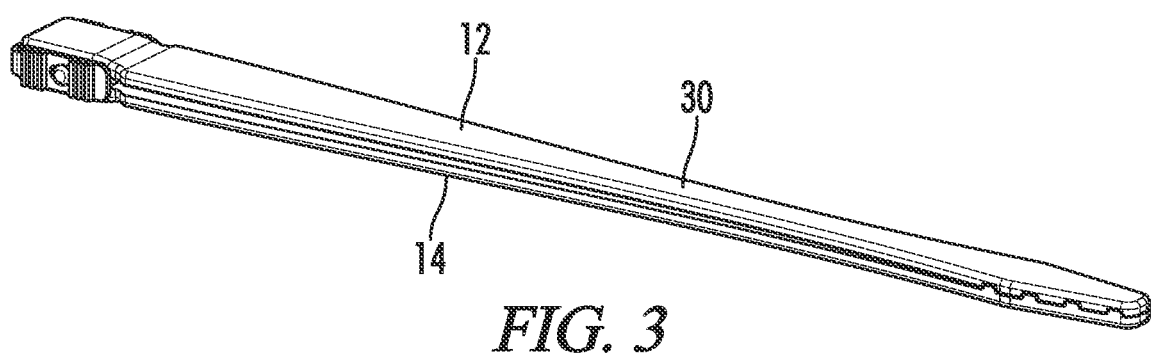
FIG. 3 illustrates a side perspective view of the eating utensil of FIG. 1 with the eating utensil in the closed position.
Figure 4:
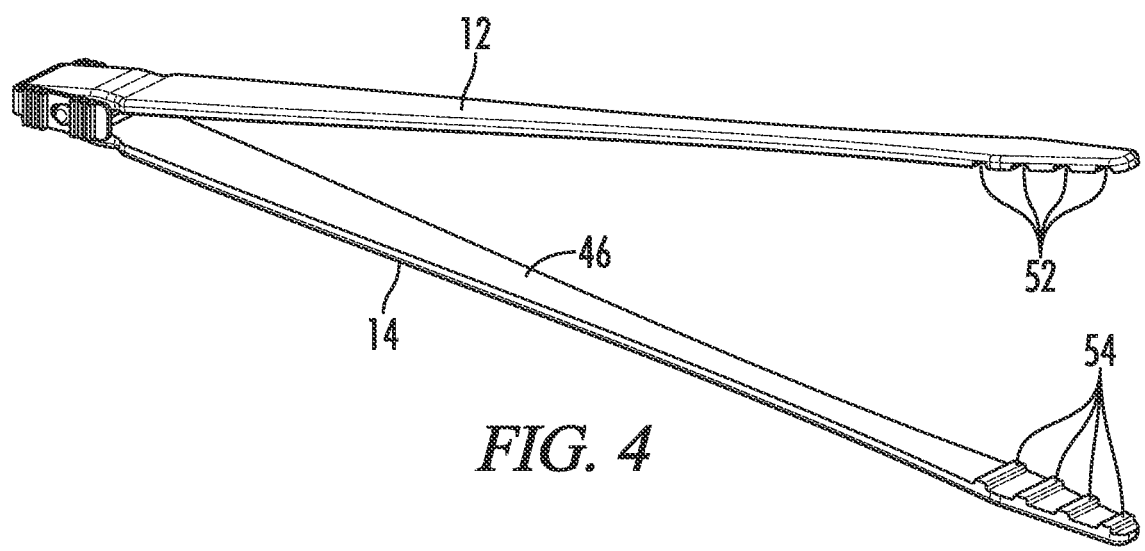
FIG. 4 illustrates a side perspective view of the eating utensil of FIG. 1 with the eating utensil in the open position.

With reference to FIGS. 1-16 the present disclosure provides an eating utensil designated by the numeral 10. In the drawings, not all reference numbers are included in each of the drawings for the sake of clarity. FIGS. 1-16 are generally drawn to scale, however, it will be appreciated that other dimensions are possible. Referring further to FIGS. 1-16, in certain embodiments, the eating utensil includes a top arm 12 and a bottom arm 14. Optionally, each of the top arm 12 and the bottom arm 14 includes a front end 16, a rear end 18, a length 20 extending from the front end 16 to the rear end 18, a left side 22, a right side 24, a width 26 extending from the left side 22 to the right side 24 perpendicular to the length 20, an interior surface 28, an exterior surface 30 opposite the interior surface 28, and a thickness 32 extending from the interior surface to the exterior surface and perpendicular to the width 26 and length 20. The interior surface 28 of the top arm 12 faces the interior surface 46 of the bottom arm 14. In other words, the interior surface 28 of the top arm 12 is the bottom surface of the top arm 12 and the interior surface 46 of the bottom arm 14 is the top surface of the bottom arm 14, whereas the exterior surface 30 of the top arm 12 is the top surface of the top arm 12 and the exterior surface 48 of the bottom arm 14 is the bottom surface of the bottom arm 14.

Optionally, the top arm 12 is pivotally attached to the bottom arm 14 adjacent to the rear ends 18,36 of the top arm 12 and bottom arm 14. Optionally, the top arm 12 and the bottom arm 14 each have a length 20,38 of from about 5 inches to about 8 inches. Optionally, the top arm 12 and the bottom arm 14 each have a maximum width 26,44 of from about 0.25 inches to about 0.75 inches. Optionally, the interior surfaces 28,46 each of the top arm 12 and bottom arm 14 comprise a plurality of grooves 52 and ridges 54 extending across the interior surface 28,46 of the respective arm 12, 14 and parallel to the widths 26,44 of the respective arm 12,14, and optionally the plurality of grooves 52 and ridges 54 are located adjacent the front ends 16,34 of the respective arm 12,14. Optionally, as shown in FIGS. 2-7, for example, the eating utensil 10 is configured to pivot between a closed position in which the plurality of grooves 52 and ridges 54 of the top arm 12 mate with the plurality of grooves 52 and ridges 54 of the bottom arm 14 and an open position in which the plurality of grooves 52 and ridges 54 of the top arm 12 are apart from the plurality of grooves 52 and ridges 54 of the bottom arm 14. In other words, the plurality of grooves 52 of the top arm 12 are aligned with the ridges 54 of the bottom arm 14 and the ridges 54 of the top arm 12 are aligned with the grooves 52 of the bottom arm 14 so that the grooves 52 and ridges 54 may be thought of as mating teeth. Optionally, each arm 12,14 has a series of at least two (preferably at least three) rows of grooves 52 and at least two (preferably at least three) rows of ridges 54 with neighboring rows of ridges 54 separated by a groove 52, as seen in FIGS. 1-9 and 13 for example. Optionally, the ridges 54 on the top arm 12 are spaced equally apart and the ridges 54 on the bottom arm 14 are spaced equally apart. Optionally, as seen in FIGS. 7C, 8, 9 and 15, for example, the eating utensil 10 further comprises a spring 56 having a first end 58 confronting the interior surface 28 of the top arm and a second end 60 confronting the interior surface 46 of the bottom arm 14 and further wherein the spring 56 is configured to bias the eating utensil 10 in the open position.

Optionally, the eating utensil 10 further comprises a pivot pin 62 connecting the top arm 12 to the bottom arm 14, the pivot pin 62 located adjacent the rear ends 18,36 of the top arm 12 and bottom arm 14 and extending parallel to the widths 44,26 of the bottom arm 14 and the top arm 12, wherein the spring 56 extends around the pivot pin 62, wherein the pivot pin 62 forms a pivot axis 64 extending parallel to the widths 44,26 of the bottom arm 14 and the top arm 12 and further wherein the top arm 12 and the bottom arm 14 are configured to rotate about the pivot axis 64 when the eating utensil 10 pivots between the open position and the closed position.

Optionally, the interior surfaces 28,46 of each of the top arm 12 and bottom arm 14 each comprise at least one protrusion 66,70 extending toward the interior surface 28, 46 of the other arm 12, 14, the at least one protrusion 66,70 comprising a hole 68,72 capturing the spring 56. The protrusions 66,70 are optionally located adjacent the rear ends 18, 36 of the arms 12, 14.

Optionally, the eating utensil 10 further comprises a lock, the lock, when engaged, preventing the eating utensil 10 from pivoting from the closed position to the open position. For example, in the illustrated embodiment, the lock is in the form of a U-shaped slide 74 comprising a left side 76 comprising a hole 84 receiving the pivot pin 62 and configured to slide along the left sides 22,40 of the top arm and the bottom arm, a right side 78 comprising a hole 84 receiving the pivot pin 62 and configured to slide along the right sides 24,42 of the top arm 12 and the bottom arm 14, and a rear end 80 facing the rear ends 18,36 of the top arm 12 and the bottom arm 14. Optionally, moving the U-shaped slide 74 forwardly is configured to engage the lock and moving the U-shaped slide 74 rearwardly is configured to disengage the lock and allow the eating utensil 10 to pivot between the open position and the closed position. Optionally, to aid in gripping the U-shaped slide 74, each of the left side and right side 76,78 of the U-shaped slide 74 comprise at least one ridge 82 extending parallel to the thicknesses 32,50 of the respective arm 12, 14 to allow a user to grip the U-shaped slide 74.

Optionally, unlike tongs, the top arm 12 and bottom arm 14 are not hollow. For example, optionally, the top arm 12 is a solid piece of metal and the bottom arm 14 is a solid piece of metal. For example, the top arm 12 and the bottom arm 14 may be stainless steel. Optionally, the exterior surfaces 30,48 of each of the top arm 12 and the bottom arm 14 are flat.

Optionally, as shown in FIGS. 5A, 5C,6A and 7A, for example, the top arm 12 and bottom arm 14 each comprise a front section 86,88 in the shape of a truncated diamond (with the front ends 16,34 of the top arm 12 and bottom arm 14 being rounded) and further wherein the front sections 86,88 of the top arm 12 and the bottom arm 14 comprise at least some of the plurality of ridges 54 and grooves 52. Optionally, the front sections 86,88 of the top arm 12 and the bottom arm 14 comprise all the plurality of ridges 54 and grooves 52. Optionally, the top arm 12 and the bottom arm 14 each comprise an intermediate section 90,92 located immediately rearwardly relative to the front section 86,88, and optionally, the intermediate sections 90,92 comprise a maximum width 26, 44 of between about 0.2 inches to about 0.3 inches. Optionally, the top arm 12 and the bottom arm 14 each comprise a rear section 94,96 located immediately rearwardly relative to the intermediate section 90,92 of the respective arm 12, 14, and optionally the rear sections 94,96 comprise a maximum width 26, 44 of from about 0.4 inches to about 0.6 inches. Optionally, the rear sections 94,96 taper in decreasing width 26, 44 as the rear sections 94,96 approach the intermediate sections 90,92. Optionally, the width 26 of the front end 16 of the top arm 12 is less than the minimum width 26 of the intermediate section 90 of the top arm 12 and optionally, the width 44 of the front end 34 of the bottom arm 12 is less than the minimum width 44 of the intermediate section 92 of the bottom arm 14.

Figure 14:
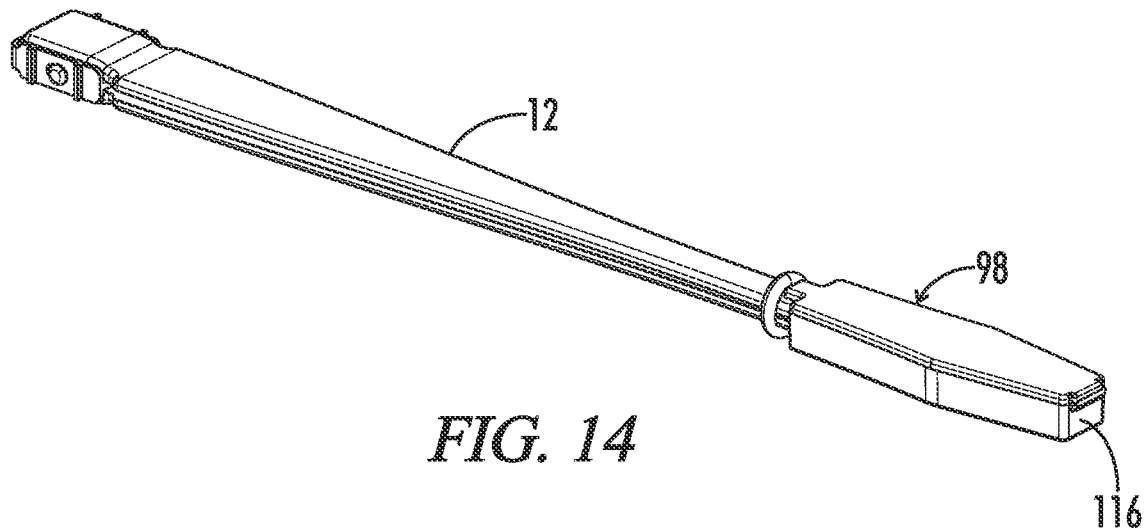
FIG. 14 illustrates a side perspective view of the eating utensil of FIG. with the front sections of the top and bottom arms located in a cover.
Figure 15:
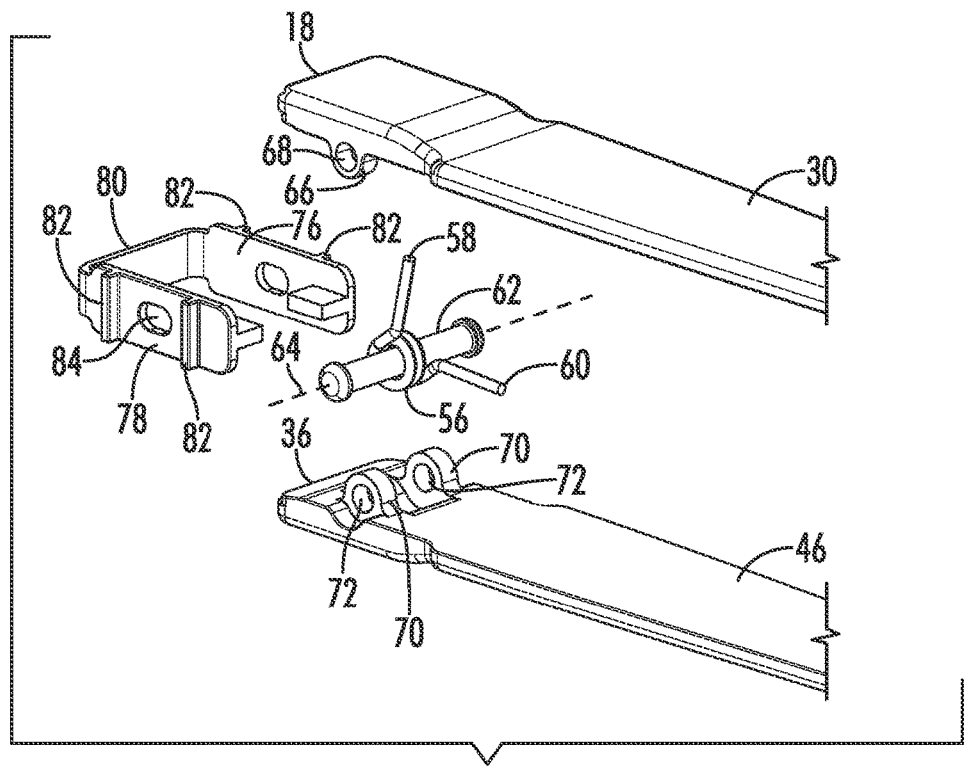
FIG. 15 illustrates a side perspective exploded view of the rear of the eating utensil of FIG. 13.
Figure 16:
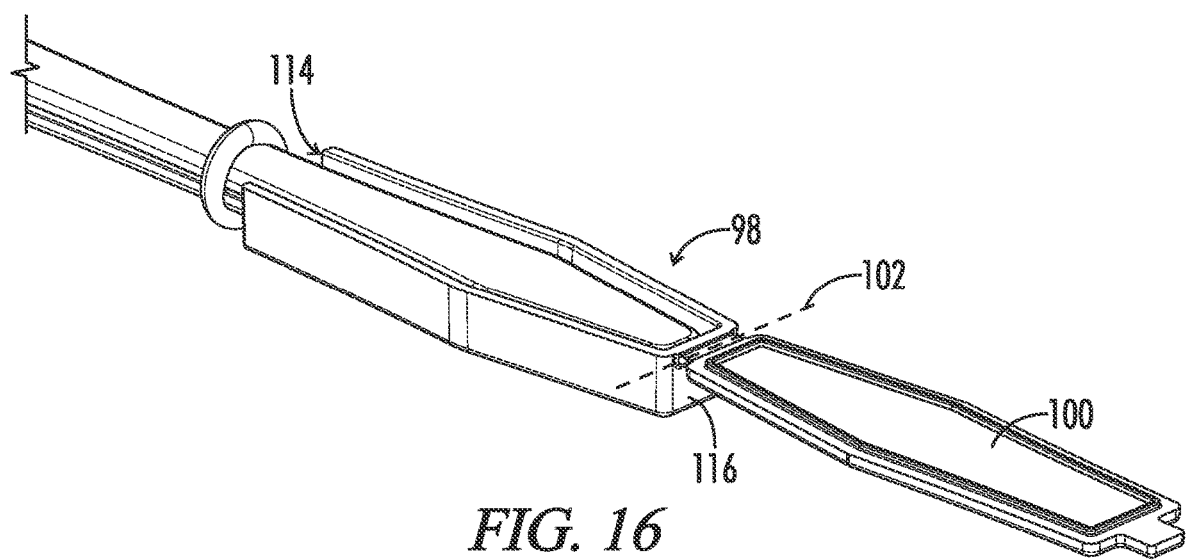
FIG. 16 illustrates a side perspective view of the front of the eating utensil of FIG. 13 located in a cover.

Optionally, as shown in FIGS. 14 and 16, the eating utensil 10 includes a cover 98 in the shape of a truncated diamond and further wherein the front sections of the top and bottom arm 86,88 are located in the cover 98. Optionally, the cover 98 further comprises a lid 100 configured to open and close along a lid axis 102 parallel to the widths 26,44 of the top arm 12 and bottom arm 14, the cover 98 further comprising an open rear 114 and a front side 116 opposite the open rear, the front side 116 facing the front ends 16,34 of the top arm 12 and bottom arm 14.

Optionally, the top arm 12 and bottom arm 14 have the same dimensions and preferably are mirror images of each other.

Optionally, the widths 26,44 of each of the top arm 12 and the bottom arm 14 vary along the lengths of the respective arm 12, 14.

Optionally, the top arm 12 and the bottom arm 14 each have a length 20,38 of from about 6.5 inches to about 7 inches.

Optionally, the plurality of ridges 54 have a height of between about 0.02 inches and about 0.04 inches and optionally the plurality of grooves 52 have a depth of between about 0.02 inches and about 0.04 inches. (The height and depth are parallel to the thickness 32, 50 of the respective arm, 12, 14).

Optionally, the plurality of ridges 54 have a length 108 of between about 0.05 inches and about 0.15 inches and optionally the plurality of grooves 52 have a length 110 of between about 0.1 inches and about 0.25 inches. (The length 108 is parallel to the length 20, 38 of the respective arm 12, 14).

Optionally, the distance 118 between the interior surface 28 of the top arm 28 and the interior surface 46 of the bottom arm 46 in the closed position at the pivot pin 62 is between about 0.025 inches and about 0.075 inches.

Figure 5:
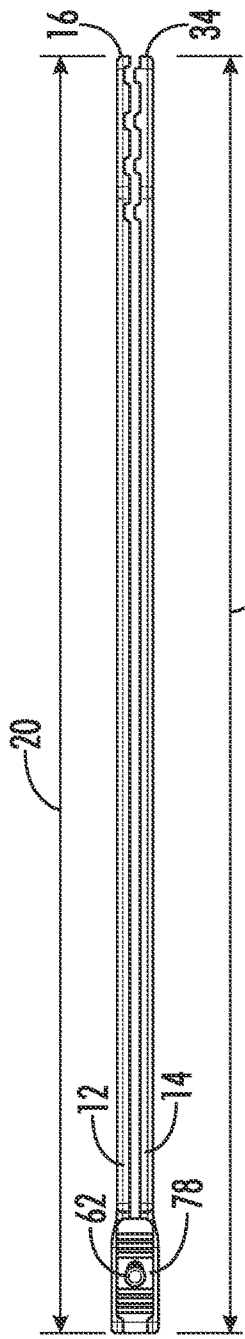
FIG. 5 illustrates a side elevation view of the eating utensil of FIG. 1 with the eating utensil in the partially closed position.
Figure 5A:
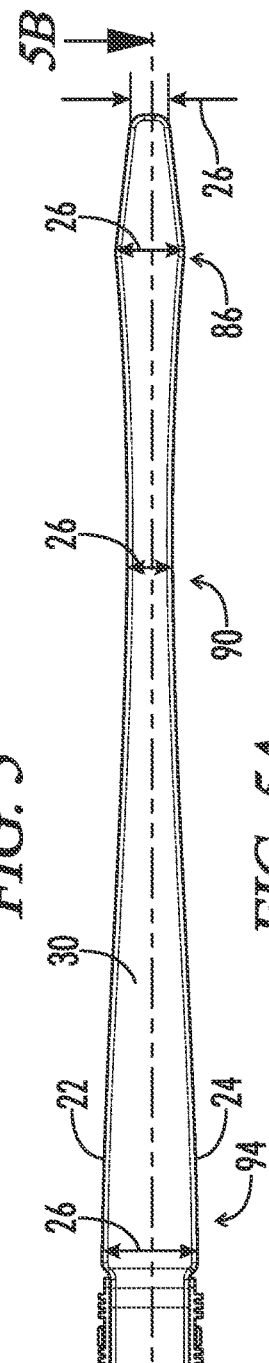
FIG. 5A illustrates a top plan view of the eating utensil of FIG. 1 with the eating utensil in the partially closed position.
Figure 5B:
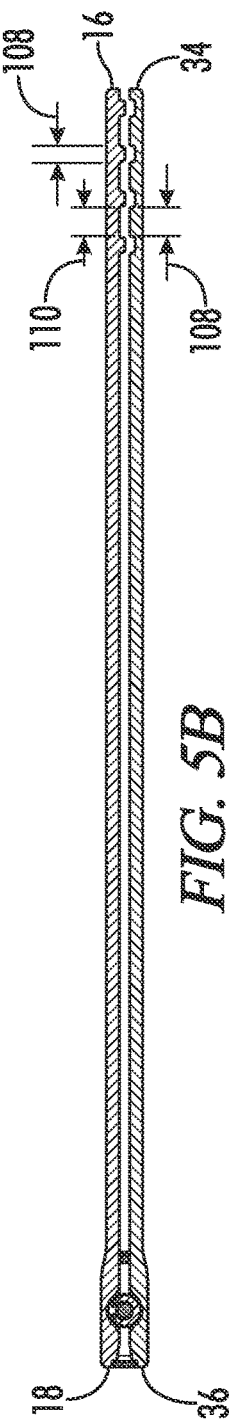
FIG. 5B illustrates a side cross-sectional view of the eating utensil of FIG. 1 taken along line 5B-5B of FIG. 5A.
Figure 5C:
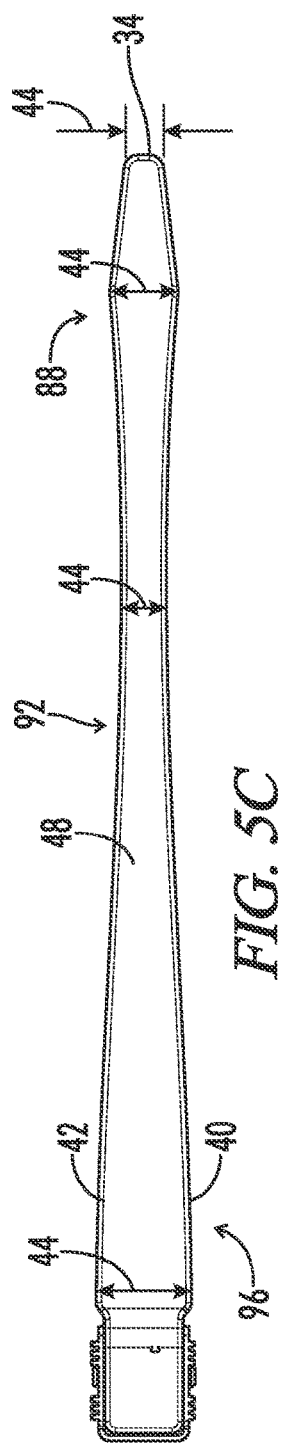
FIG. 5C illustrates a bottom plan view of the eating utensil of FIG. 1 with the eating utensil in the partially closed position.
Figure 8:
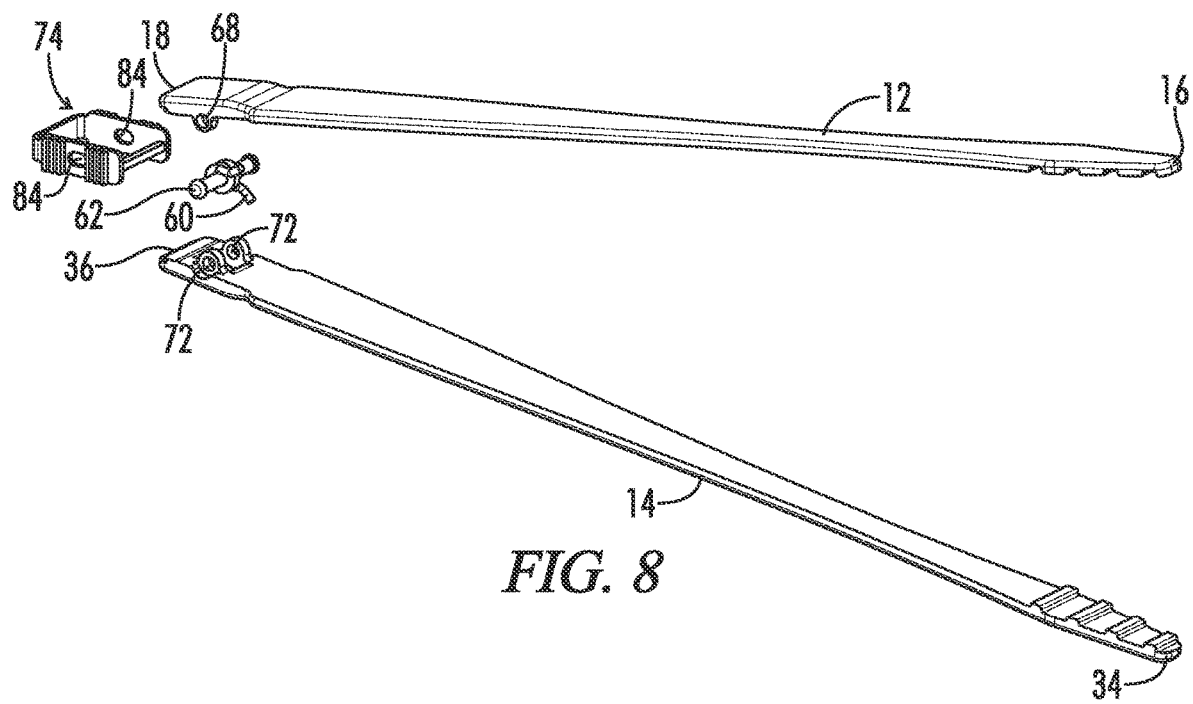
FIG. 8 illustrates a side perspective exploded view of the eating utensil of FIG. 1 with the eating utensil in the open position.
Figure 9:
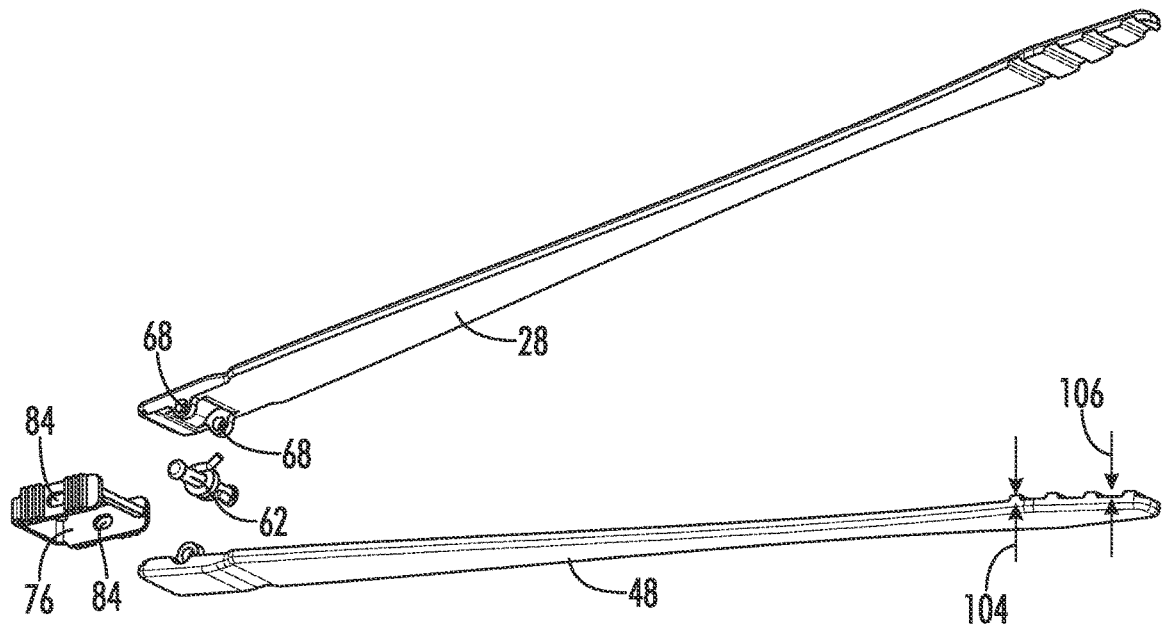
FIG. 9 illustrates another side perspective exploded view of the eating utensil of FIG. 1 with the eating utensil in the open position.
Figure 10:
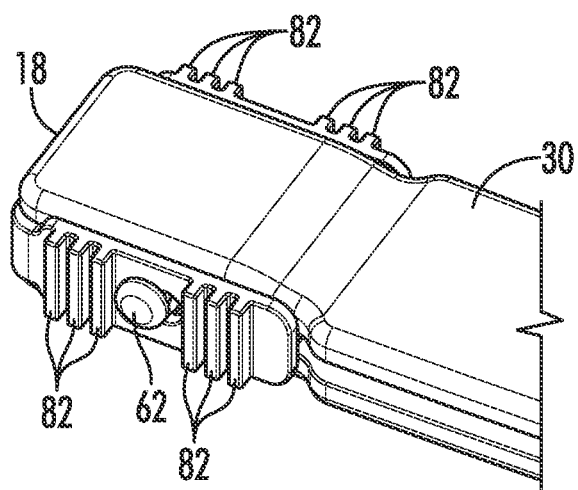
FIG. 10 illustrates a side perspective view of the rear of the eating utensil of FIG. 1 with the eating utensil in the closed position and the lock engaged.
Figure 11:
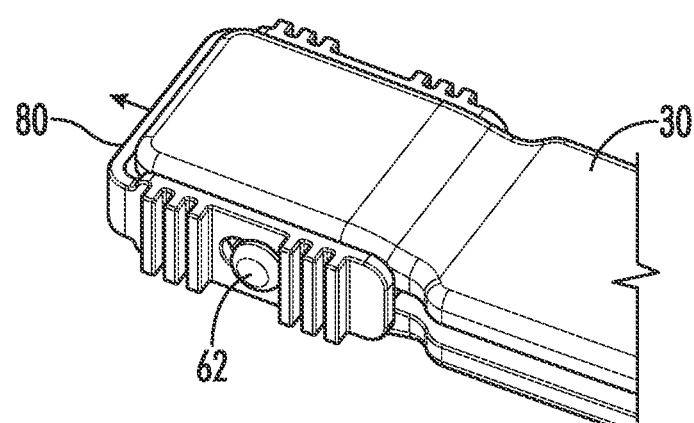
FIG. 11 illustrates a side perspective view of the rear of the eating utensil of FIG. 1 with the eating utensil in the closed position and the lock disengaged.
Figure 12:
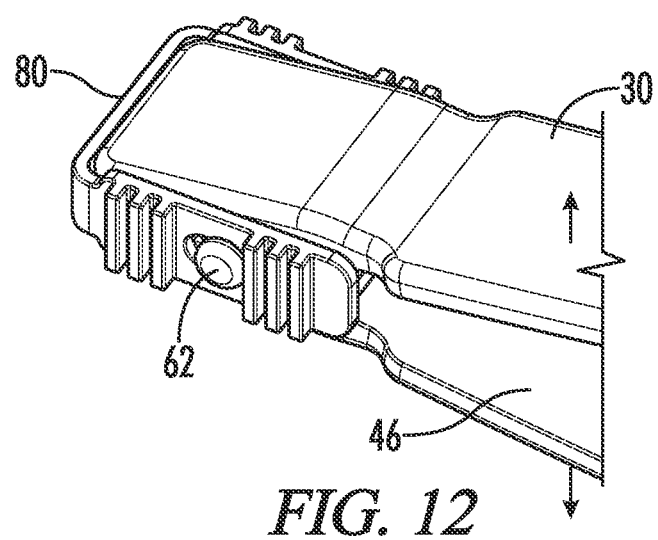
FIG. 12 illustrates a side perspective view of the rear of the eating utensil of FIG. 1 with the eating utensil in the open position and the lock disengaged.
Figure 13:
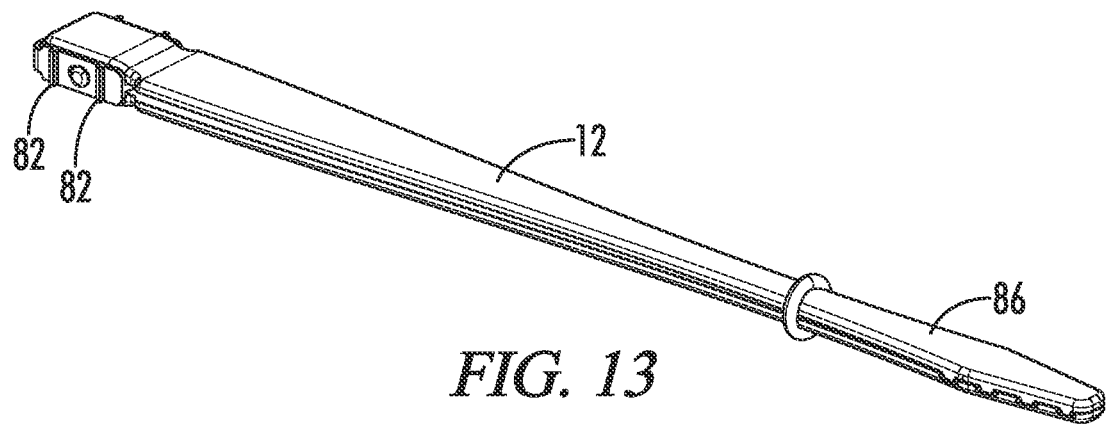
FIG. 13 illustrates a side perspective view of an eating utensil of another embodiment of the present invention.

Optionally, as shown in FIG. 5B, for example, the average (mean) length 110 of the grooves 52 of the top arm 12 is greater than the average (mean) length 110 of the grooves 52 of the bottom arm 14 and optionally, the average (mean) length 108 of the ridges 54 of the top arm 12 is less than the average (mean) length 108 of the ridges 54 of the bottom arm 14. Given that the eating utensil 10 may be rotated by the user, it will be understood that the reverse may be true—i.e., that the bottom arm 14 may have longer grooves 52 but shorter ridges 54 than the top arm 12. In other words, one arm may have longer grooves 52 but shorter ridges 54 than the other arm. Optionally, the grooves 52 and ridges 54 are rectangular.

Optionally, each arm has an average (mean) thickness 32,50 of from about 0.05 inches to about 0.1 inches.

The eating utensil 10 may be used in any suitable method. For example, as shown in FIG. 1, the eating utensil 10 may be held like chopsticks and may be used in a method that includes one or more of the following steps: a) providing the eating utensil 10 wherein the eating utensil 10 is in the open position; b) placing at least one finger of a human user on the top arm 12 of the eating utensil 10; c) placing at least one other finger of the human user on the bottom arm 14, wherein the at least one other finger is on the same hand of the human user as the least one finger; d)
  placing an item of food between the top arm 12 and the bottom arm 14 and on the grooves 52 and ridges 54 of the top arm 12 and bottom arm 14; e) pivoting the eating utensil toward the closed position to secure the item of food between the top arm 12 and the bottom arm 14; and f) eating the item of food.

It will be understood that the aforementioned of use is merely exemplary and that the eating utensil 10 may be held in any suitable manner.

Without being bound by any particular theory, the eating utensil 10 may be used, for example, to remove chips from a bag and eating the chips without getting one's hands messy. Again, it will be understood that the aforementioned of use is merely exemplary and that the eating utensil 10 may be used in any suitable manner.

Without being bound by any particular theory, the ridges 52 and grooves 54 may be used to grip the food.

| Part List | |
|---|---|
| Eating utensil | 10 |
| Top arm | 12 |
| Bottom arm | 14 |
| Top arm front end | 16 |
| Top arm rear end | 18 |
| Top arm length | 20 |
| Top arm left side | 22 |
| Top arm right side | 24 |
| Top arm width | 26 |
| Top arm interior/bottom surface | 28 |
| Top arm exterior/top surface | 30 |
| Top arm thickness | 32 |
| Bottom arm front end | 34 |
| Bottom arm rear end | 36 |
| Bottom arm length | 38 |
| Bottom arm left side | 40 |

-continued

| Part List | |
|---|---|
| Bottom arm right side | 42 |
| Bottom arm width | 44 |
| Bottom arm interior/top surface | 46 |
| Bottom arm exterior/bottom surface | 48 |
| Bottom arm thickness | 50 |
| Grooves | 52 |
| Ridges | 54 |
| Spring | 56 |
| Spring first end | 58 |
| Spring second end | 60 |
| Pivot pin | 62 |
| Pivot axis | 64 |
| Top arm protrusion | 66 |
| Top arm protrusion hole | 68 |
| Bottom arm protrusion | 70 |
| Bottom arm protrusion hole | 72 |
| U-shaped slide | 74 |
| U-shaped slide left side | 76 |
| U-shaped slide right side | 78 |
| U-shaped slide rear end | 80 |
| U-shaped slide ridges | 82 |
| U-shaped slide holes | 84 |
| Top arm front section | 86 |
| Bottom arm front section | 88 |
| Top arm intermediate section | 90 |
| Bottom arm intermediate section | 92 |
| Top arm rear section | 94 |
| Bottom arm rear section | 96 |
| Cover | 98 |
| Cover lid | 100 |
| Lid axis | 102 |
| Height of ridges | 104 |
| Depth grooves | 106 |
| Length of ridges | 108 |
| Length of grooves | 110 |
| Cover open rear | 114 |
| Cover front side | 116 |
| Distance between arms at the pivot pin | 118 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed. Use of the singular embraces the plural.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. An eating utensil comprising:
a top arm and a bottom arm, each of the top arm and the bottom arm comprising a front end, a rear end, a length extending from the front end to the rear end, a left side, a right side, a width extending from the left side to the right side and perpendicular to the length, an interior surface, an exterior surface opposite the interior surface, and a thickness extending from the interior surface to the exterior surface and perpendicular to the width and length;
wherein the interior surface of the top arm faces the interior surface of the bottom arm;

wherein the top arm is pivotally attached to the bottom arm adjacent to the rear ends of the top arm and bottom arm;

wherein the top arm and the bottom arm each have a length of from about 5 inches to about 8 inches, wherein the top arm and the bottom arm each have a maximum width of from about 0.25 inches to about 0.75 inches, wherein the interior surfaces of each of the top arm and bottom arm comprise a plurality of grooves and ridges extending across the interior surface of the respective arm and parallel to the widths of the respective arm, the plurality of grooves and ridges located adjacent the front ends of the respective arm;

wherein the eating utensil is configured to pivot between a closed position in which the plurality of grooves and ridges of the top arm mate with the plurality of grooves and ridges of the bottom arm and an open position in which the plurality of grooves and ridges of the top arm are apart from the plurality of grooves and ridges of the bottom arm; and further wherein the eating utensil further comprises a spring configured to bias the eating utensil in the open position.

2. The eating utensil of claim 1 wherein the eating utensil further comprises a pivot pin connecting the top arm to the bottom arm, the pivot pin located adjacent the rear ends of the top arm and bottom arm and extending parallel to the widths of the bottom arm and the top arm, wherein the spring extends around the pivot pin, wherein the pivot pin forms a pivot axis extending parallel to the widths of the bottom arm and the top arm and further wherein the top arm and the bottom arm are configured to rotate about the pivot axis when the eating utensil pivots between the open position and the closed position.

3. The eating utensil of claim 2 wherein, adjacent to the rear ends of the respective arms, the interior surfaces of each of the top arm and bottom arm each comprise at least one protrusion extending toward the interior surface of the other arm, the at least one protrusion comprising a hole capturing the spring.

4. The eating utensil of claim 2 wherein the eating utensil further comprises a lock, the lock, when engaged, preventing the eating utensil from pivoting from the closed position to the open position.

5. The eating utensil of claim 4 wherein the lock is in the form of a U-shaped slide comprising a left side comprising a hole receiving the pivot pin and configured to slide along the left sides of the top arm and the bottom arm, a right side comprising a hole receiving the pivot pin and configured to slide along the right sides of the top arm and the bottom arm, and a rear end facing the rear ends of the top arm and the bottom arm, wherein moving the U-shaped slide forwardly is configured to engage the lock and further wherein moving the U-shaped slide rearwardly is configured to disengage the lock and allow the eating utensil to pivot between the open position and the closed position.

6. The eating utensil of claim 5 wherein each of the left side and right side of the U-shaped slide comprise at least one ridge extending parallel to the thicknesses of the respective arm to allow a user to grip the U-shaped slide.

7. The eating utensil of claim 1 wherein the spring comprises a first end confronting the interior surface of the top arm and a second end confronting the interior surface of the bottom arm.

8. The eating utensil of claim 1 wherein the top arm is a solid piece of metal and the bottom arm is a solid piece of metal.

9. The eating utensil of claim 1 wherein the exterior surfaces of each of the top arm and the bottom arm are flat.

10. The eating utensil of claim 1 wherein the top arm and bottom arm each comprise a front section in the shape of a truncated diamond, and further wherein the front sections of the top arm and the bottom arm comprise at least some of the plurality of ridges and grooves.

11. The eating utensil of claim 10 wherein further wherein the front sections of the top arm and the bottom arm comprise all the plurality of ridges and grooves.

12. The eating utensil of claim 10 wherein the top arm and the bottom arm each comprise an intermediate section located immediately rearwardly relative to the front section, and further wherein the intermediate sections comprise a maximum width of between about 0.2 inches to about 0.3 inches.

13. The eating utensil of claim 12 wherein the top arm and the bottom arm each comprise a rear section located immediately rearwardly relative to the intermediate section of the respective arm, and further wherein the rear sections comprise a maximum width of from about 0.4 inches to about 0.6 inches, and further wherein the rear sections taper in decreasing width as the rear sections approach the intermediate sections.

14. The eating utensil of claim 12 wherein the width of the front end of the top arm is less than the minimum width of the intermediate section of the top arm and further wherein the width of the front end of the bottom arm is less than the minimum width of the intermediate section of the bottom arm.

15. The eating utensil of claim 1 further comprising a cover in the shape of a truncated diamond and further wherein the front sections of the top and bottom arm are located in the cover.

16. The eating utensil of claim 15 wherein the cover further comprises a lid configured to open and close along a lid axis parallel to the widths of the top arm and bottom arm, the further comprising an open rear and a front side opposite the open rear, the front side facing the front ends of the top arm and bottom arm.

17. The eating utensil of claim 1 wherein the top arm and bottom arm are mirror images of each other.

18. The eating utensil of claim 1 wherein the widths of each of the top arm and the bottom arm vary along the lengths of the respective arm.

19. The eating utensil of claim 1 wherein the top arm and the bottom arm each have a length of from about 6.5 inches to about 7 inches.

20. The eating utensil of claim 1 wherein the plurality of ridges of each arm have a height that is parallel to the thickness of the respective arm is between about 0.02 inches and about 0.04 inches and further wherein the plurality of grooves of each arm have a depth that is parallel to the thickness of the respective arm that is between about 0.02 inches and about 0.04 inches.

21. The eating utensil of claim 1 wherein the plurality of ridges of each arm have a length that is parallel to the length of the respective arm that is between about 0.05 inches and about 0.15 inches and further wherein the plurality of grooves of each arm have a length that is parallel to the length of the respective arm that is between about 0.1 inches and about 0.25 inches.

22. The eating utensil of claim 1 wherein the top arm and the bottom arm each comprise at least three rows of ridges and three rows of grooves and further wherein adjacent ridges on the top arm are spaced equally apart by a groove and each row of adjacent ridges on the bottom arm are spaced equally apart by a groove.

23. The eating utensil of claim 1 wherein the distance between the interior surface of the top surface and the interior surface of the bottom arm in the closed position at the pivot pin is between about 0.025 inches and about 0.075 inches.

24. The eating utensil of claim 1 wherein one arm has longer grooves but shorter ridges than the other arm.

25. The eating utensil of claim 1 wherein each arm has an average (mean) thickness of from about 0.05 inches to about 0.1 inches.

26. The eating utensil of claim 1 wherein the grooves and ridges are rectangular.

27. A method of using an eating utensil comprising the steps of:
 a) providing the eating utensil of claim 1;
 b) placing an item of food between the top arm and the bottom arm; and
 c) moving the item of food into a human user's mouth.

28. A method of using an eating utensil comprising the steps of:
 a) providing the eating utensil of claim 1 wherein the eating utensil is in the open position;
 b) placing at least one finger of a human user on the top arm of the eating utensil;
 c) placing at least one other finger of the human user on the bottom arm, wherein the at least one other finger is on the same hand of the human user as the least one finger;
 d) placing an item of food between the top arm and the bottom arm and on the grooves and ridges of the top arm and bottom arm; and
 e) pivoting the eating utensil toward the closed position to secure the item of food between the top arm and the bottom arm.

29. The method of claim 28 further comprising: f) eating the item of food.

* * * * *